US012598003B2

(12) United States Patent
Stampoulidis et al.

(10) Patent No.: US 12,598,003 B2
(45) Date of Patent: Apr. 7, 2026

(54) INTEGRATED COHERENT RECEIVER HAVING A SINGLE MMI COUPLER OPTICAL HYBRID, NON-INTERSECTING OPTICAL PATHS AND UNIFORM ELECTRICAL PATHS

(71) Applicant: LEO SPACE PHOTONICS, Agia Paraskevi (GR)

(72) Inventors: Leontios Stampoulidis, Agia Paraskevi (GR); Ahmed Osman, Agia Paraskevi (GR); Ilias Sourikopoulos, Agia Paraskevi (GR)

(73) Assignee: LEO SPACE PHOTONICS, Agia Paraskevi (GR)

( * ) Notice: Subject to any disclaimer, the term of this patent is extended or adjusted under 35 U.S.C. 154(b) by 307 days.

(21) Appl. No.: 18/289,246

(22) PCT Filed: May 13, 2022

(86) PCT No.: PCT/EP2022/063014
§ 371 (c)(1),
(2) Date: Nov. 2, 2023

(87) PCT Pub. No.: WO2022/243184
PCT Pub. Date: Nov. 24, 2022

(65) Prior Publication Data
US 2024/0259108 A1      Aug. 1, 2024

(30) Foreign Application Priority Data

May 21, 2021   (EP) ..................................... 21175458

(51) Int. Cl.
*H04B 10/61*          (2013.01)
(52) U.S. Cl.
CPC ....... *H04B 10/6151* (2013.01); *H04B 10/614* (2013.01)
(58) Field of Classification Search
None
See application file for complete search history.

(56) References Cited

U.S. PATENT DOCUMENTS

| 10,126,498 | B1 | 11/2018 | Ma et al. | |
|---|---|---|---|---|
| 11,740,411 | B2 * | 8/2023 | Dong .................. | G02B 6/29301 385/43 |
| 2010/0166427 | A1 * | 7/2010 | Jeong ..................... | H04B 10/65 398/82 |
| 2012/0106984 | A1 * | 5/2012 | Jones ...................... | H04B 10/60 398/214 |
| 2012/0230631 | A1 * | 9/2012 | Jeong .................. | G02B 6/12004 385/24 |
| 2016/0285561 | A1 * | 9/2016 | Wu ........................ | H04B 10/613 |
| 2017/0207603 | A1 * | 7/2017 | Evans ................. | H01S 5/06256 |
| 2019/0049665 | A1 * | 2/2019 | Ma ...................... | G02B 6/12016 |
| 2019/0074911 | A1 * | 3/2019 | Bitauld .................. | H04B 10/70 |
| 2019/0221995 | A1 * | 7/2019 | Heaton ................... | H01S 5/124 |
| 2021/0270698 | A1 * | 9/2021 | Sugiyama .............. | G01M 11/33 |
| 2021/0344426 | A1 * | 11/2021 | Bitauld ................. | H04L 9/0858 |

OTHER PUBLICATIONS

Faralli et al., "A Compact Silicon Coherent Receiver Without Waveguide Crossing", IEEE Photonics Journa, vol. 7, No. 4, Aug. 1, 2015; pp. 1-6.

* cited by examiner

*Primary Examiner* — Li Liu
(74) *Attorney, Agent, or Firm* — DP IP GROUP; Franco S. De Liguori

(57) ABSTRACT

A coherent receiver optical sub-assembly photonic integrated circuit has optical input ports, electrical output ports, photodetectors, and a single multi-mode interference (MMI) coupler. The optical input ports receive a phase modulated optical signal (S) and a continuous wave local oscillator (LO) optical signal. The electrical output ports output electrical signals corresponding to mixing products of the S and LO optical signals. The photodetectors are connected to the electrical output ports through electrical lines. The MMI coupler has a main body, input access waveguides, and output access waveguides. The input access waveguides receive the S and LO optical signals from the input ports and launch light to the main body. The output access waveguides are connected to respective ones of the photodetectors through optical waveguides. The output access waveguides collect multi-mode interference signal products from the main body and deliver the mixing products of the S and LO optic signals.

7 Claims, 9 Drawing Sheets y x

32A

31A

33A

31B

33B

32B

33C

INTEGRATED COHERENT RECEIVER HAVING A SINGLE MMI COUPLER OPTICAL HYBRID, NON-INTERSECTING OPTICAL PATHS AND UNIFORM ELECTRICAL PATHS

TECHNICAL FIELD

The present disclosure relates to photonic integrated circuits and in particular to integrated optical hybrid mixers applicable to optical coherent detection.

BACKGROUND

Coherent optical communications are increasingly deployed in modern telecommunication networks due to the higher spectral efficiency, improved receiver sensitivity and robustness against optical link impairments compared to traditional direct detection systems. In conventional coherent optical communication systems, coherent detection is deployed, where the received optical signal(S) is mixed with a continuous wave optical signal (LO) to recover amplitude and phase information. It is commonly known in the art to use four photodetectors to convert electrically quadrature signal components from the optical mixing products in a balanced detection scheme. The device that performs the signal mixing and balanced detection functions is usually and commonly referred to as coherent receiver optical sub-assembly (C-ROSA). A block diagram of a C-ROSA is shown in FIG. 1 and C-ROSA systems belonging to the state of the art are shown in figures 2-7.

A C-ROSA typically requires a 90-degree optical hybrid (OH) circuit to combine the S and LO signals as shown in FIG. 1. The OH has typically two input ports that receive the optical S and LO signals and four output ports which deliver the mixing products of S and LO, each having a phase increment of 90-degrees. The optical signals appearing at the four OH outputs are coupled to four photodetectors (PDs) that deliver electrical signals corresponding to the quadrature components of the demodulated input.

Focusing on the OH element, this is typically implemented with a pair of cross coupled 1×2 optical splitters and 2×2 optical combiners, as shown in FIG. 2 at 23, assisted by a 90-degree phase shifter which is used to provide the 90-degree port-to-port phase shift at the OH outputs. The four outputs of the 2×2 optical combiners are then connected to four PDs to deliver the balanced detection function.

In terms of hardware implementation, a C-ROSA can be fabricated with different technologies that include but are not limited to, fiber optics, free-space optics and integrated optics. The latter has been recognized as the most appealing since it favours small form factors and reduced production costs. In such case the C-ROSA is implemented as a photonic circuit that integrates the OH and PDs on a single wafer substrate through methods that include, but are not limited to, monolithic, hybrid or heterogenous integration. In the C-ROSA photonic integrated circuit (C-ROSA PIC), the OH is implemented using integrated optical coupler and waveguide elements. With reference to FIG. 2, the area 30 around OH 23 which is contained within the boundaries of C-ROSA 20, is used for waveguide routing.

In terms of functionality, phase errors and power imbalance are considered critical in the coherent receiver performance. A phase error in a coherent receiver is defined as the deviation of the inter-port phase shift increment $\Delta\Phi_{s\text{-}LO}$ from 90 degrees. A power imbalance is defined as difference in optical power of the signals at the OH outputs. In a C-ROSA PIC power imbalance and detrimental signal cross-talk occur due to waveguide crossings within and outside the OH. Additionally, phase errors may occur within but also outside the OH; the former is the case where the integrated optical waveguides that cross-couple the optical splitters and combiners have unequal lengths, whereas the latter is the case where the integrated optical waveguides that interconnect the OH outputs to the PDs have unequal lengths.

Phase errors in coherent receivers are commonly suppressed by introducing phase tuning elements within the OH. As an example, and with reference to FIG. 2, the 90-degree phase shifter 28 would be tuneable to compensate the phase errors introduced by the length mismatch of the integrated optical waveguides used to cross-couple the optical splitters and combiners of the OH. Avoiding the use of tuneable elements is possible by breaking the symmetry of the optical splitters and combiners, as shown in FIG. 3. However, in both C-ROSA PICs of FIG. 2 and FIG. 3 waveguide crossings are necessary within the OH.

By further adjusting the position and layout of the optical splitters and combiners of the OH it is possible to have a C-ROSA PIC with non-intersecting and length-matched integrated optical waveguides within and outside the OH as shown in FIG. 4 and disclosed for example in: US 2020/0096699. Such C-ROSA PIC uses the same number of splitter and coupler components as the C-ROSA shown in FIG. 2 and FIG. 3 which can be implemented as a combination of Y-branches and multi-mode interference (MMI) couplers. Recent advances in MMI coupler technology enables the implementation of OH circuits using a single MMI coupler component, as such a further reduction of the OH component count with respect to [US2020/0096699] would be possible.

FIG. 5 shows a prior art C-ROSA PIC where the OH is realized by such 4×4 MMI coupler. The circuit merges the coupler and splitter component set of the conventional C-ROSA into a single component and avoids the use of waveguide crossings within the OH, but it still requires waveguide crossings outside the OH and in the interconnection of the MMI coupler OH outputs to the PDs. Such drawback may be overcome by using an additional 2×2 MMI coupler as shown in FIG. 6 and disclosed in U.S. Pat. No. 8,280,256. In such case the effective reduction in the number of coupler and splitter component set compared to conventional C-ROSAs is 50% (2 instead of 4).

FIG. 7 shows a prior art C-ROSA PIC disclosed in US 2016285561, where the OH is realized by a single 4×4 MMI coupler while avoiding waveguide crossings outside the OH. This is facilitated by the geometric arrangement of the PDs which are misaligned across a horizontal axis, whereas their optical axes are oriented parallel to the chip input facet. The MMI coupler optical axis is oriented either parallel or perpendicular to the chip input facet. In these geometric arrangements the MMI coupler outputs are connected to the PDs with optical waveguides that do not intersect but have inherently unequal lengths. This optical imbalance is equalized in the electrical domain by adjusting the electrical lines which connect the outputs of the PDs to the electrical outputs of the C-ROSA PIC. As such the electrical paths are non-uniform. In such case, effective reduction in the number of MMI coupler components compared to the C-ROSA PIC of FIG. 6 is 50% (1 instead of 2), however at the expense of additional design overhead imposed by the necessary co-design of the optical and electrical paths. In addition to the design complexity, the use of non-uniform electrical paths imposes different parasitic effects on the electrical signals propagating through these paths affecting the uniformity of the RF performance of the C-ROSA PIC.

It would be desirable to have a C-ROSA PIC that can deliver the OH function using a single optical component, such as an MMI coupler, avoiding intersecting integrated optical waveguides outside the OH and without having to include any additional optical coupler components except the MMI coupler OH. Such a solution should also accommodate equal lengths of the integrated optical waveguides that interconnect the OH and the PDs as well as uniform electrical paths between the PDs and the electrical output of the C-ROSA PIC. It would be advantageous in terms of phase error, power imbalance performance and optimized RF performance as well as in terms of design and fabrication complexity of the C-ROSA PIC.

It is thus the object of the present disclosure to provide a high-performance C-ROSA PIC that deploys a single MMI coupler to deliver the OH function, avoids the use of waveguide crossings and deploys equal-length optical and uniform electrical paths. By deploying a minimum set of integrated components and avoiding the correlation between optical and electrical paths, the C-ROSA of the present disclosure optimizes optical and electrical performance and minimizes design and fabrication complexity.

SUMMARY

According to aspects of the present disclosure a C-ROSA PIC is provided that comprises a substrate upon which the following elements are disposed; at least two input ports for delivering optical signals, four output ports for delivering electrical signals, a plurality of PDs arranged in the vicinity of the output ports and a single MMI coupler having a main body and comprising a plurality of input access waveguides and a plurality of output access waveguides wherein the plurality of input access waveguides are configured to launch light to the main body of the MMI coupler and the plurality of output access waveguides are configured to collect the multi-mode interference signal products from the main body of the MMI coupler.

In other aspects of the disclosure, a first optical signal provided by a first output from the plurality of output access waveguides is the mixing product of a first optical signal and a second optical signal that is received from a first input and a second input from the plurality of input access waveguides.

According to other aspects of the disclosure each one of the plurality of the output access waveguides of the MMI coupler is connected to the plurality of PDs through optical waveguides and each one of the plurality of PDs are connected to the electrical outputs of the C-ROSA PIC though electrical lines.

According to other aspects of the disclosure the PDs are arranged across an axis perpendicular to the optical axis of the MMI coupler.

According to other aspects of the disclosure, the MMI coupler is aligned arranged with its axis perpendicular to the arrangement axis of the PDs and with the plurality of its input access waveguides facing the plurality of the PDs.

In other aspects of the disclosure, the optical waveguides interconnecting the MMI coupler output access waveguides to PDs comprise either straight portions or bent portions or combination of both straight and bent portions selected to provide equalized optical paths.

According to other aspects of the disclosure, the electrical lines interconnecting the PDs to the electrical outputs of the C-ROSA PIC are uniform.

According to other aspects of the disclosure, two C-ROSA PIC devices comprise a common substrate with a first input access waveguide of each MMI coupler connected to a first and second output of a polarization splitter (PS) and a second input access waveguide of each MMI coupler connected to a first and second output of an optical splitter (OS). The PS and OS are disposed on the substrate with the input of the PS receiving an optical signal having two polarization components and the input of the OS receiving an optical signal having a single polarization component.

Devices and techniques are disclosed for photonic circuits operating as integrated optical coherent receiver sub-assemblies that contain 90-degree OHs formed of a single MMI coupler for signal mixing with the MMI coupler output access waveguides connected directly to cascaded PDs through non-intersecting integrated optical waveguides of equal length and the cascaded PDs connected to the receiver electrical outputs through uniform electrical lines. The optical coherent receiver allows phase balance, power balance and uniform RF performance of the detected signal components as required by reliable coherent detection communication systems.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present disclosure and is not intended to represent the only embodiments in which the present invention can be practiced. The "exemplary" embodiment should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Furthermore, the following abbreviations and acronyms may be used in the present document:

C-ROSA Coherent Receiver Optical Sub-Assembly
LO Local Oscillator
MMI Multimode Interference
OC Optical Combiner
OH Optical Hybrid
OS Optical Splitter
PD Photodetector
PIC Photonic Integrated Circuit
PS Polarization splitter
S Signal
TIA Transimpedance Amplifier The present disclosure relates to PICS, and particularly to optical coherent receivers that feature a single MMI coupler OH, non-intersecting optical waveguides and uniform electrical lines.

Figure 8:
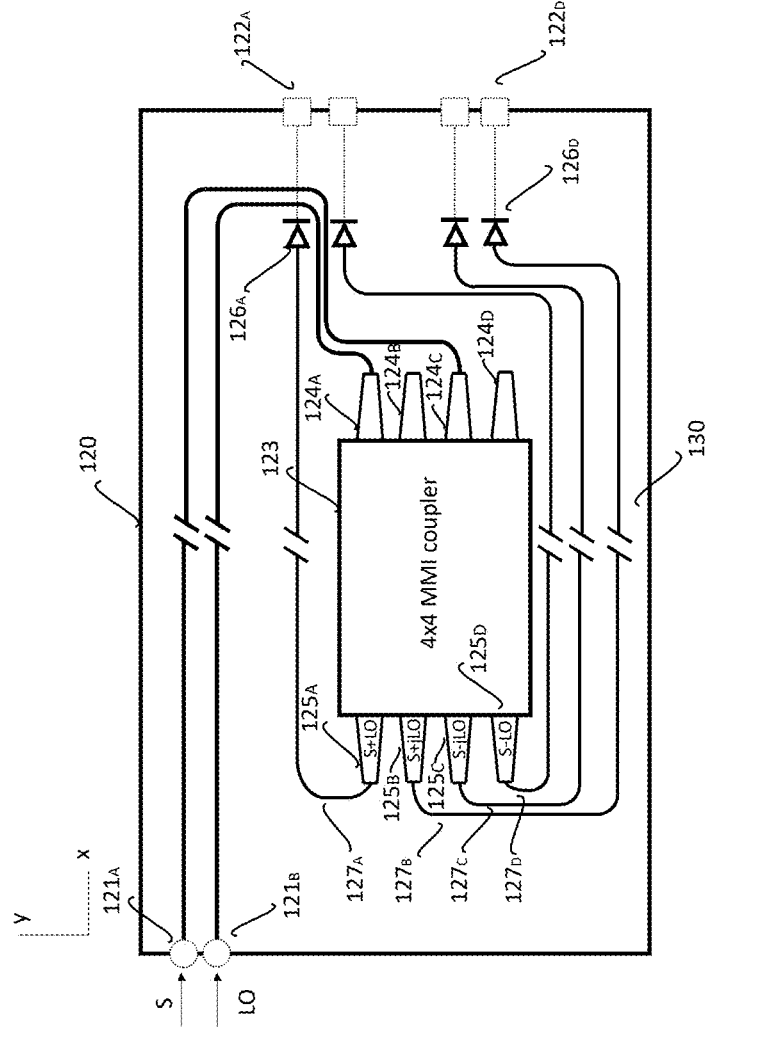
FIG. 8 shows a schematic diagram of a C-ROSA according to the current inventive concept comprising a 90-degree OH formed of a single 4×4 MMI coupler wherein the output access waveguides of the MMI coupler are connected to the photodetectors via non-intersecting and length-matched integrated optical waveguides and the PDs are connected to the electrical outputs via uniform electrical lines.

With reference to FIG. 8 that shows a first embodiment of the present disclosure, a C- ROSA PIC is disposed upon a substrate and having two optical input ports and four electrical output ports. The PIC further includes four PDs forming two pairs of balanced PDs disposed upon the substrate in proximity to the C-ROSA electrical outputs and arranged across a vertical or horizontal axis. Each PD is connected to an electrical output through an electrical line for example a conducting lead. The C-ROSA PIC further includes a single 4×4 MMI coupler configured to operate as a 90-degree OH, having a main body 123, comprising four attached input access waveguides 124-A through 124-D and four attached output access waveguides 125-A through 125-D. The MMI coupler is disposed upon the substrate with its optical axis perpendicular to the arrangement axis of the PDs and with its input access waveguides facing the PDs, this geometric arrangement is referred to as "flip configuration". The PIC further includes four integrated optical waveguides disposed upon the waveguide routing area 130 of the substrate to separately interconnect the MMI coupler output access waveguides 125-A through 125-D to PDs 126-A through 126-D in a non-intersecting manner and without the intervention of a second coupler component. In examples, the MMI coupler arranged in the "flip configuration", is disposed upon the substrate in a location that allows the interconnection of its output access waveguides to the PDs via non-intersecting optical waveguides of equal length. In examples, the MMI coupler arranged in the "flip configuration" is disposed upon the substrate in any area allowed by its geometrical characteristics.

In other examples, the integrated optical waveguides 127-A through 127-D interconnecting the MMI coupler output access waveguides 125-A through 125-D to PDs 126-A through 126-D are adjusted to have equal lengths by suitable waveguide routing within the waveguide routing area 130 of the substrate.

In other examples, the electrical lines interconnecting the PDs 126-A through 126-B to the electrical outputs 122-A through 122-D are uniform and independent of the integrated optical waveguides 127-A through 127-D.

Figure 9:
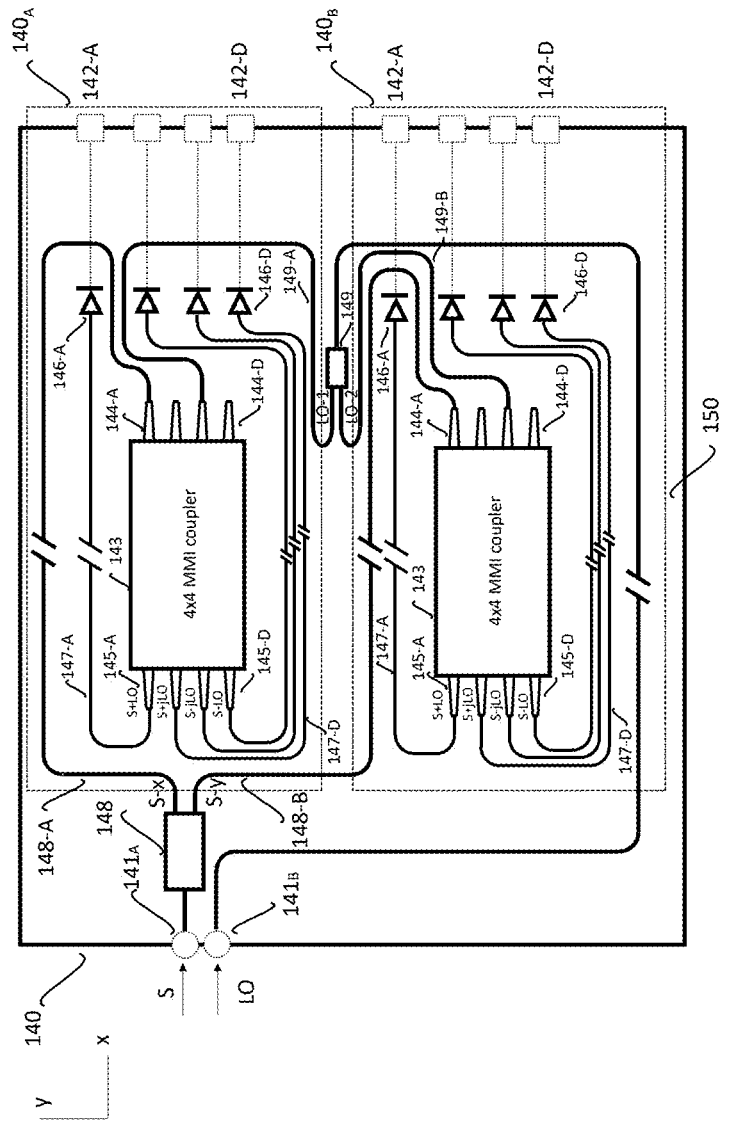
FIG. 9 shows a schematic diagram of a second embodiment according to the current inventive concept which is a dual-polarization coherent receiver comprising two C-ROSA PIC devices of FIG. 8 sharing the same substrate and further including a polarization splitter and an optical splitter.

With reference to FIG. 9 that shows a second embodiment of the present disclosure, a coherent receiver is formed using two C-ROSA PIC devices of the type and function as the one illustrated in FIG. 8, sharing a common substrate and indicated in FIG. 9 as 140-A and 140-B. A polarization splitter 148 disposed on the same substrate splits the Signal (S) into two orthogonal polarizations, indicated in FIG. 9 as S-x and S-y, and routes them to the first input access waveguides of MMI 143 of C-ROSA 140-A and 140-B respectively. The OS 149 splits the LO signal into two portions, indicated in FIG. 9 as LO-1 and LO-2, and routes them to the second input access waveguides of MMI 143 of the C-ROSA 140-A and 140-B respectively. In this arrangement C-ROSA 140 is configured to perform dual-polarization coherent detection, namely coherent detection of a signal S that comprises two orthogonally polarized signal components.

Figure 1:
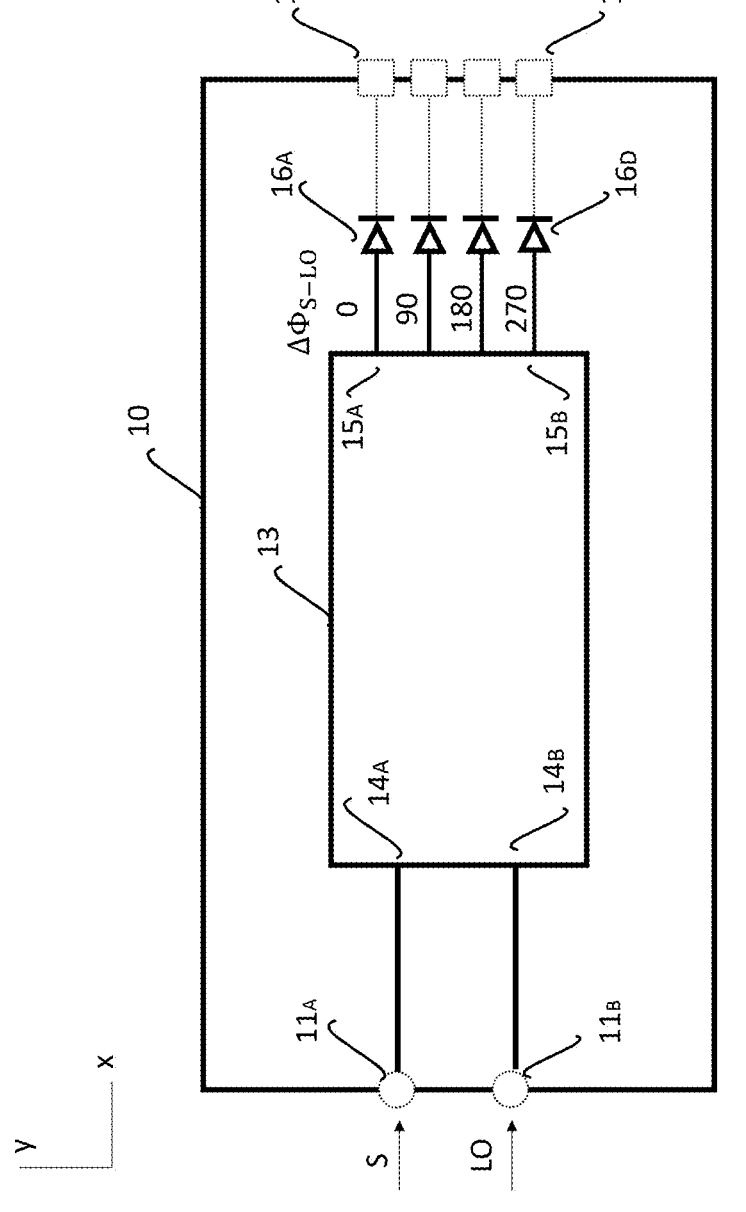
FIG. 1 shows a generic schematic diagram of a C-ROSA.

FIG. 1 shows an abstraction of a known in the art C-ROSA 10. The input ports 11-A and 11-B (indicated with dotted circles) receive the S and LO optical signals. The output ports (indicated with dotted squares) deliver electrical signals corresponding to the quadrature components of the demodulated input.

The S and LO signals are combined into OH 13. OH 13 has two input ports 14-A and 14-B connected to C-ROSA PIC input ports 11-A and 11-B, and four output ports 15-A through 15-D, which output the mixing products of S and LO, each having a phase increment of 90 degrees. The optical signals appearing at 15-A through 15-D are coupled to four PDs depicted as 16-A through 16-D. PDs 16-A through 16-D are connected via conducting leads, which are illustrated with dotted lines, to electrical pads 12-A through 12-D. Pads 12-A through 12-D can be used to interconnect C-ROSA 10 to subsequent electrical signal processing circuitry, commonly transimpedance amplifiers (TIAs).

Figure 2:
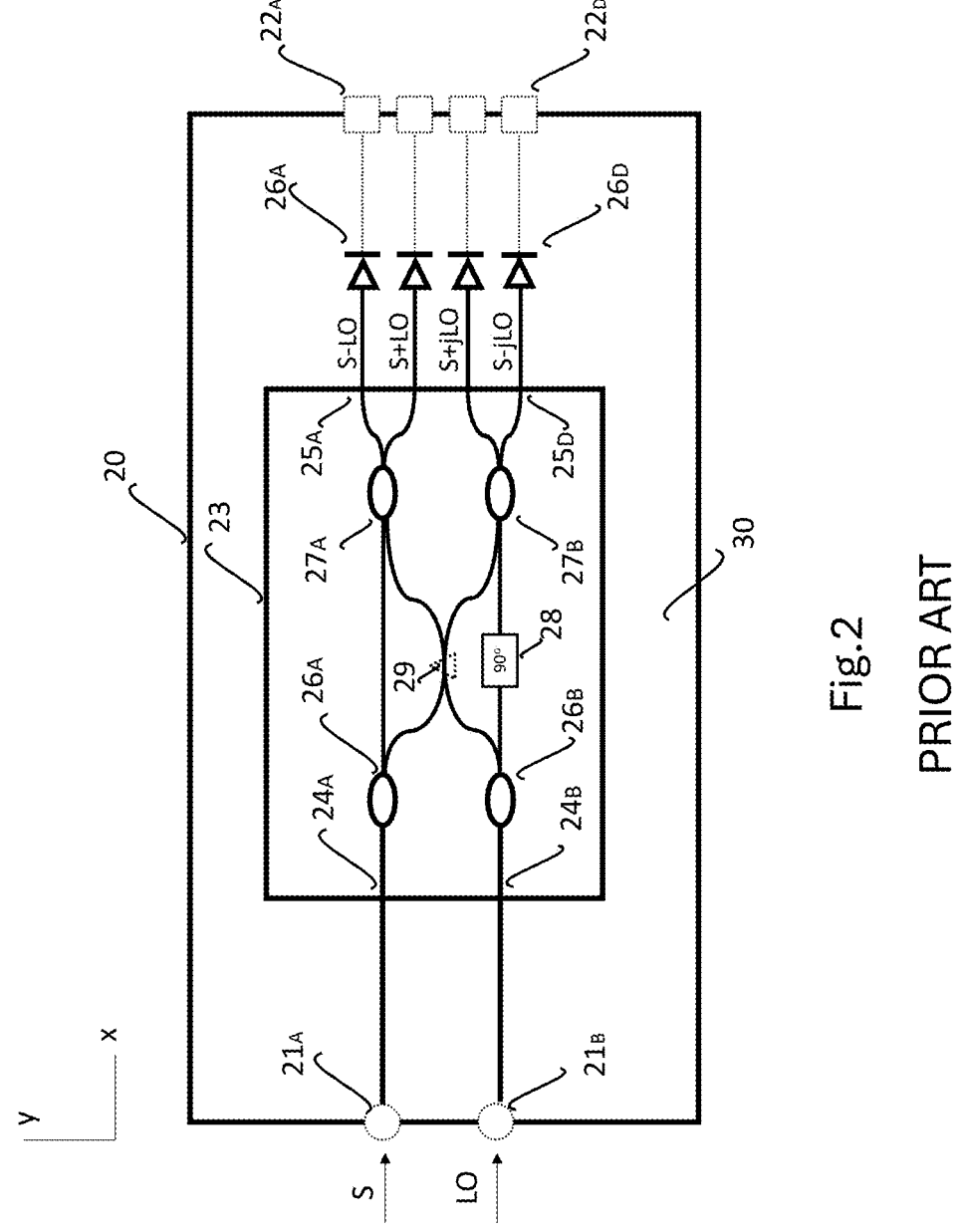
FIG. 2 shows a schematic diagram of a prior art C-ROSA comprising a conventional 90-degree OH formed by a splitter/coupler network circuit wherein output ports of splitters are cross-coupled to input ports of combiners through a pair of intersecting optical waveguides and a phase shifting element.

C-ROSA 20 in FIG. 2 is an illustration of a conventional type of a C-ROSA PIC. Similar to the abstraction C-ROSA 10 of FIG. 1, C-ROSA 20 has two input ports 21-A and 21-B, four output ports, 22-A through 22-D, and includes OH 23, which comprises input ports 24-A and 24-B and output ports 25-A through 25-D. OH 23 output ports are connected via integrated optical waveguides to PDs 26-A to 26-D, which are connected via conducting leads to electrical pads 22-A to 22-D. With C-ROSA 20 being a PIC, area 30 is used for waveguide routing.

Figure 3:
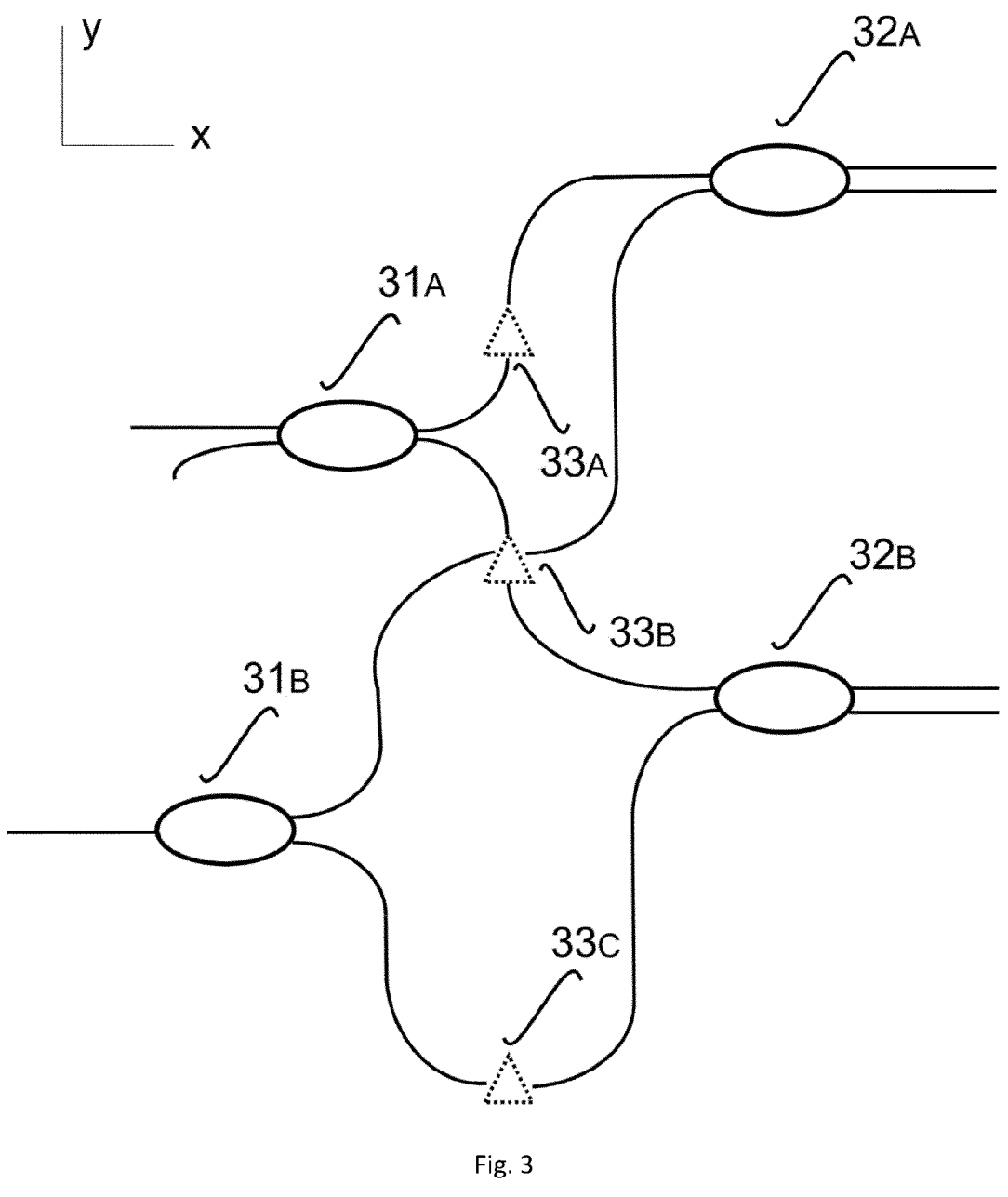
FIG. 3 shows a schematic diagram of a prior art 90-degree OH formed by a splitter/coupler network wherein output ports of the splitters are cross-coupled to input ports of combiners through equal-length, intersecting waveguides and no phase shifting element.

With reference to FIG. 2, OH 23 consists of two optical splitters (OS) 26-A and 26-B and two optical combiners (OC) 27-A and 27-B. The two OS and the two OC are identical and are drawn in symmetry about a horizontal axis, while the two OS-OC pairs are drawn in symmetry about a vertical axis. The function of each OS is to receive and equally split the S (OS 26-A) and LO (OS 26-B) signals and couple each pair of S and LO portions to the two inputs of OC 27-A and 27-B. Through this arrangement, the mixing products namely: S−LO, S+LO, S+jLO, S−jLO appear at the OH 23 output ports 25-A through 25-D, which are in turn, interconnected with integrated optical waveguides of equal length to PDs 26-A through 26-D which are in turn connected via conducting leads to electrical pads 22-A through 22-D. Within OH 23 the cross coupling of the OC outputs to the OS inputs with integrated optical waveguides requires the presence of a waveguide crossing 29. Such element can cause signal interference between the crossing waveguides and may introduce additional losses and phase distortions deteriorating the C-ROSA performance. Another element inside OH 23 is the 90-degree phase shifter 28. This is installed within one of the integrated optical waveguides that connects an OS output to an OC input and is required to obtain the port-to-port phase shift difference as indicated in FIG. 1. In practice 28 is implemented as a tuneable element; tuning is used to compensate phase shifts out of 90 degrees induced by unequal integrated optical waveguide path lengths between the OS and the OC components and/or by the waveguide crossing. An implementation that avoids the use of a tuning element is possible by a suitable layout of the OS and OC elements in non-symmetric locations as shown in FIG. 3; this time only the two OCs 32-A and 32-B are symmetric about a horizontal axis, whereas there is no symmetry between the OS-OC pairs. Still the use of waveguide crossing 33-B inside the OH is not avoided and additional signal attenuation elements 33-A and 33-C are included to mimic the waveguide crossing effect to all the signal paths that cross couple the OS and OC components.

Figure 4:
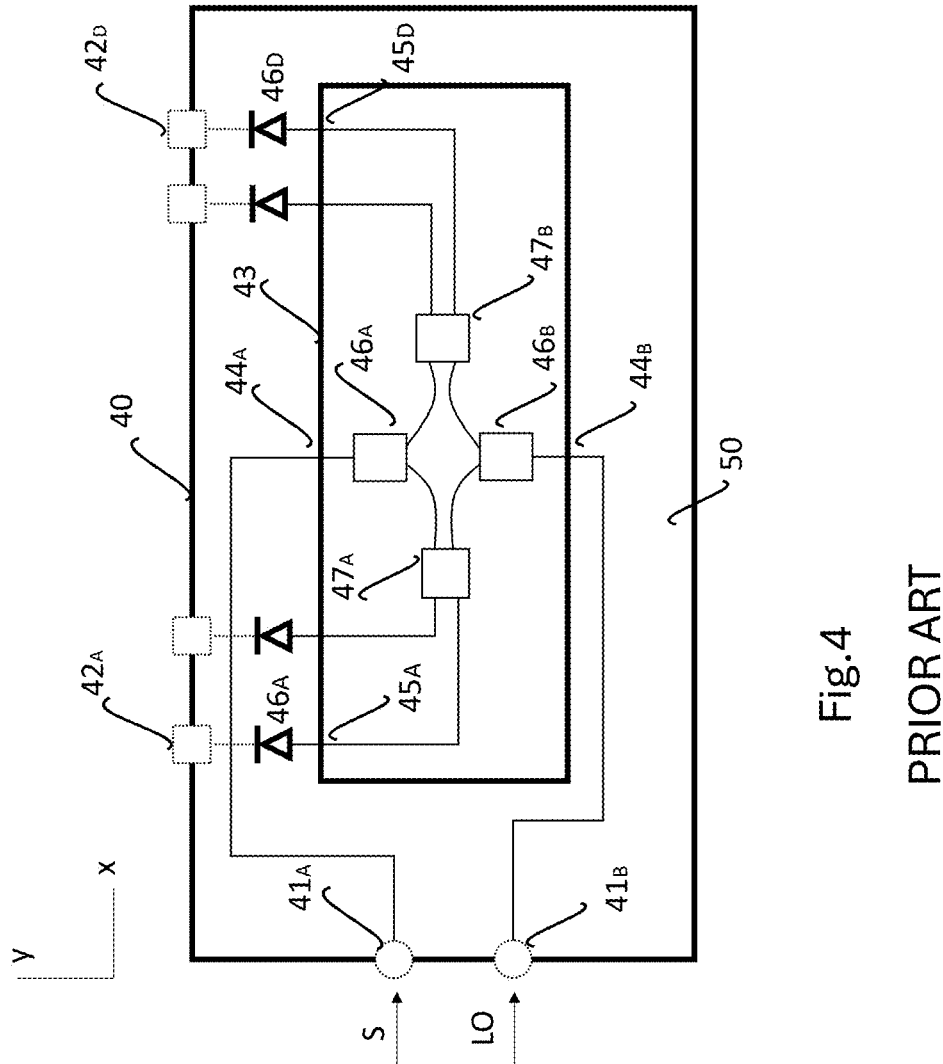
FIG. 4 shows a schematic diagram of a prior art C-ROSA comprising a 90-degree OH formed of a splitter/coupler network wherein output ports of splitters are cross-coupled to input ports of combiners through equal-length non-intersecting optical waveguides and no phase shifting element.

FIG. 4 shows a known in the art C-ROSA 40 which uses the same set of OS and OC elements as C-ROSA 20 but with a layout that is considered suitable to avoid the use of a waveguide crossing. This is possible by positioning OS 46-A and 46-B as well as OC 47-A and 47-B elements of OH 43 in a "star" configuration as shown in FIG. 4. The "star" configuration is realised by 90-degree rotation of both OS components, 180-degree rotation of one OC and symmetric arrangement of the two OC components about a vertical axis. One skilled in the art may identify that the "star" configuration enables the cross coupling of the OS and OC ports without waveguide crossings. Another difference of C-ROSA 40 compared to C-ROSA 20 is the placement of PDs 46-A through 46-D and electrical pads 42-A through 42-D to the "north" side of C-ROSA 40. This is done in order to obtain equal lengths of the integrated optical waveguides that connect the C-ROSA 40 output ports 45-A through 45-D to the PDs 46-A through 46-D. Another difference between C-ROSA 40 and C-ROSA 20 is that the area between the PDs and electrical pads is used to route the integrated optical waveguide that connects C-ROSA 40 input port 41-A to OH 43 input port 44-A. This is possible since in substrates used for integrated opto-electronics, the electrical interconnects, such as the one connecting PD 46-A to electrical pad 42-A, are present on a different level than the one where the optical waveguides are integrated.

Figure 5:
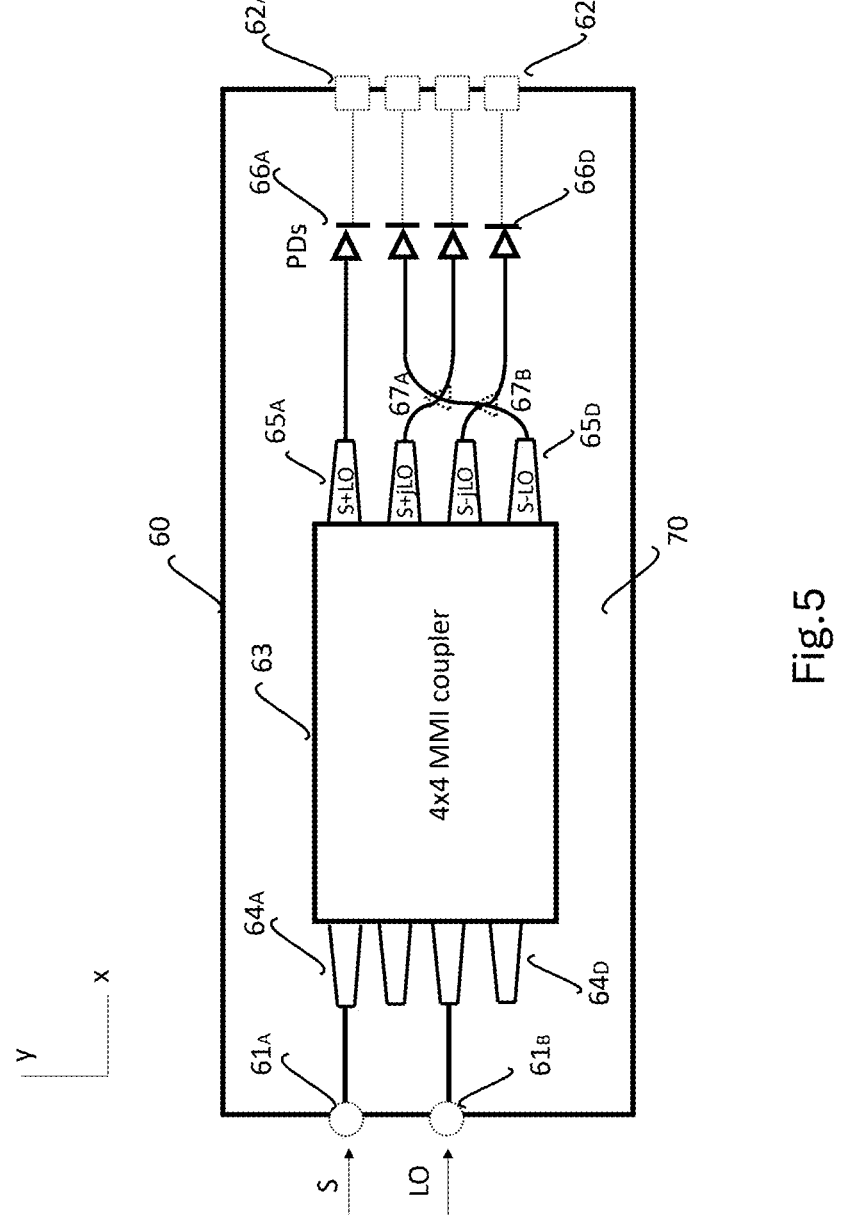
FIG. 5 shows a schematic diagram of a prior art C-ROSA comprising a 90-degree OH formed of a single MMI coupler wherein the output access waveguides of the MMI coupler are interconnected to the PDs through intersecting waveguides.

FIG. 5 shows a conventional C-ROSA 60 which is a coherent receiver optical sub-assembly implementation that merges the OS and OC components of C-ROSA 20 and 40 into a single integrated optical component that does not include any phase shifting element. This component exploits MMI effects in integrated waveguides to split and mix the optical signals that are incident on its input ports; hence it is usually referred to as an MMI coupler. In such case the OH functionality is delivered by the MMI coupler shown in a 4×4 configuration in FIG. 5. The MMI coupler has a main body 63 with attached input access waveguides 64-A through 64-D as well as attached output access waveguides 65-A through 65-D. In practice 63 is a waveguide section designed to support a plurality of modes which interfere within 63 whereas input access and output access waveguides are typically single mode and are used to launch light into 63 and collect the multi-mode interference signal products from 63 respectively. By adjusting the geometrical characteristics of 63, 64 and 65 and by launching the S and LO signals through input access waveguides 64-A and 64-C, the OH functionality can be obtained and the required 90-degree phase shifts are provided at the MMI coupler output access waveguides 65-A through 65-D. In such configuration and in accordance with the principles of self-imaging properties of N×N MMI couplers, the S and LO mixing products are delivered at the MMI coupler output access waveguides as shown in FIG. 5.

With reference to FIG. 5, it becomes evident that the S+LO and S−LO mixing products that must be coupled to PDs 66-A and 66-B in order to implement balanced detection, are spatially separated. This means that although the MMI coupler avoids waveguide crossings within the OH itself, it still requires the integrated optical waveguides that couple light from its output access waveguides 65-B through 65-D to PDs 66-B through 66-D to intersect. In that specific example, two waveguide crossings 67-A and 67-B are required.

Figure 6:
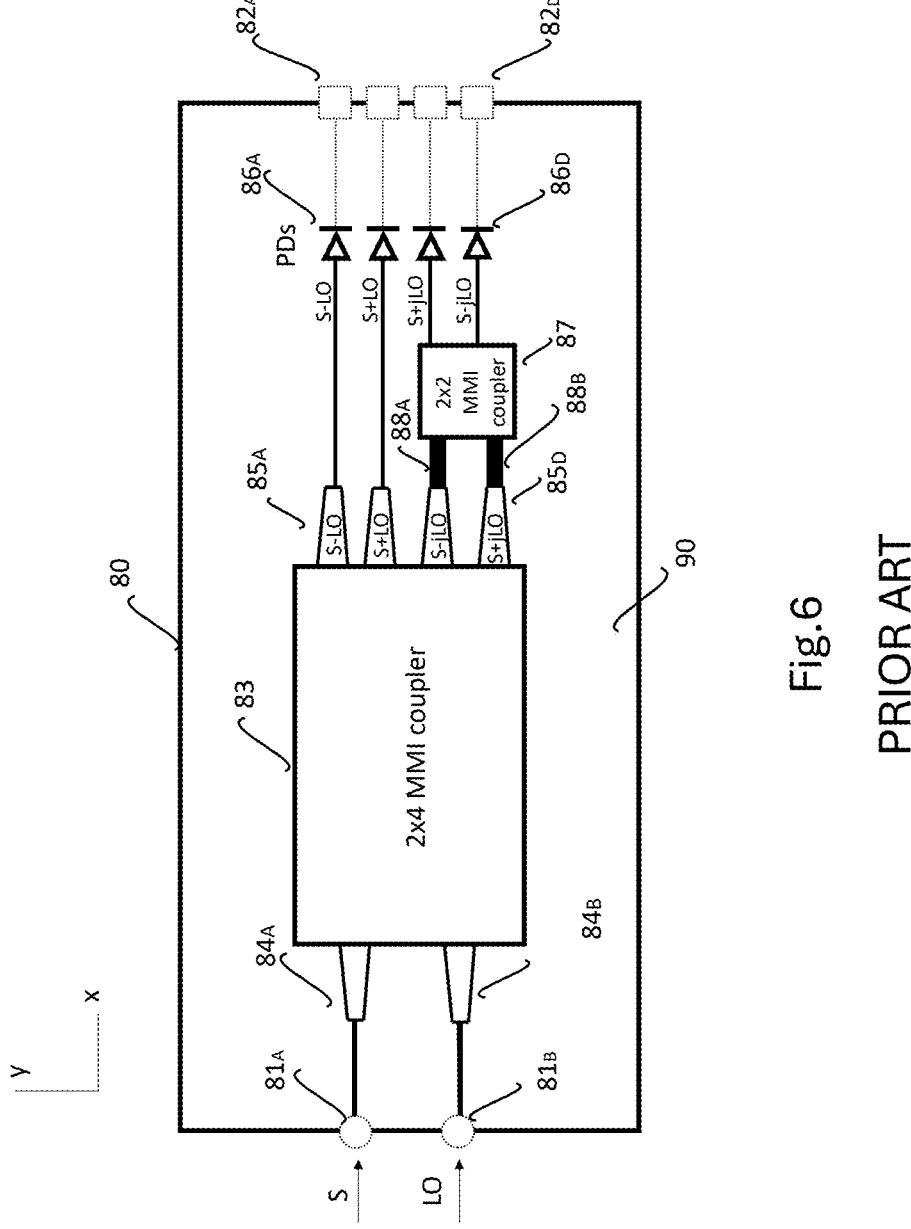
FIG. 6 shows a schematic diagram of a prior art C-ROSA comprising a 90-degree OH formed of a 2×4 MMI coupler, a 2×2 MMI coupler and phase tuning elements used to interconnect the 2×4 MMI coupler output access waveguides to input access waveguides of the 2×2 MMI coupler, wherein the PDs are connected to the corresponding output access waveguides of the 2×4 and the 2×2 MMI coupler via non-intersecting integrated optical waveguides.

FIG. 6 shows a known in the art C-ROSA 80 which is a C-ROSA PIC implementation that uses a MMI coupler-based OH and avoids waveguide crossings of the integrated optical waveguides that couple light from the OH to the PDs. This is possible by including a 2×4 MMI coupler with the geometrical characteristics of its body 83, input access waveguides 84-A-B and output access waveguides 85-A-D adjusted so that S−LO and S+LO signals appear at adjacent output access waveguides 85-A and 85-B. In such case, phase shifting elements 88-A and 88-B as well as a second MMI coupler 87 are serially connected to output access waveguides 85-C and 85-D of the first 2×4 MMI coupler. The function of these additional elements is to rotate the phase relation of the outputs of the 2×2 MMI coupler 87 by 90 degrees relative to the in-phase outputs 85-A and 85-B so that the device comprising the 2×4 and 2×2 MMI couplers functions as an OH. As such, although C-ROSA 80 delivers the S and LO mixing with a single component accounting for 75% reduction of the OH components compared to the conventional C-ROSA 40, it still requires additional coupler elements to circumvent the use of waveguide crossings. This requires careful co-design and optimization of the serially interconnected MMI couplers and phase shifter elements of the OH circuit. Finally, the effective reduction in the number of optical components of C-ROSA 80 compared to C-ROSA 40 is 50% since it deploys 2 MMI couplers instead of 4 optical splitters/combiners.

Figure 7:
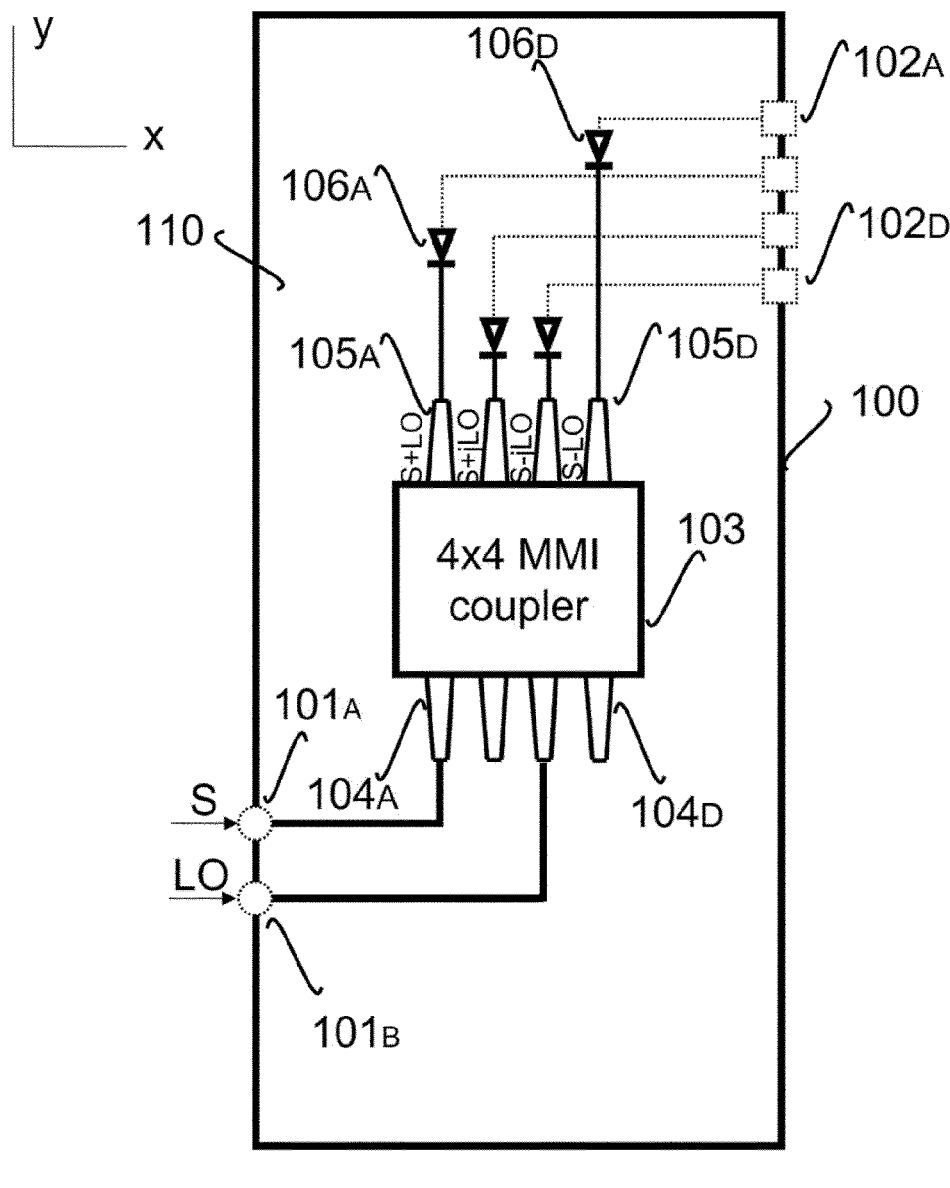
FIG. 7 shows a schematic diagram of a prior art C-ROSA comprising a 90-degree OH formed of a single MMI coupler wherein the output access waveguides of the MMI coupler are interconnected to the PDs through non-intersecting optical waveguides of unequal length and the PDs are interconnected to the electrical outputs through non-uniform electrical lines.

FIG. 7 shows a known in the art C-ROSA 100 which is a C-ROSA PIC implementation that uses a single MMI coupler 103 to deliver the OH functionality and avoids waveguide crossings of the integrated optical waveguides that couple light from the OH to the PDs. The PDs are arranged so that their optical axes are oriented parallel to the chip input facet. The avoidance of waveguide crossings is possible by misaligning the PDs 106-A and 106-D against each other and against the PD pair 106-B to 106-C. In this geometric arrangement, the integrated optical waveguides that connect the MMI coupler output access waveguides 105-A through 105-D to PDs 106-A through 106-D do not exhibit equal lengths causing optical imbalance and phase mismatch. The unequal optical lengths of the integrated optical waveguides are compensated by adjusting the subsequent electrical lines that connect PDs 106-A through 106-D to the electrical outputs 102-A through 102-D. This imposes additional design overhead since each pair of optical and electrical paths has to be correlated and carefully co-designed. Finally, the non-uniform electrical paths yield different parasitic effects on the electrical signals that propagate through these paths causing a non-uniform RF performance.

FIG. 8 that shows a first embodiment of the current inventive concept, relates to a C-ROSA PIC where the OH function is delivered by a single MMI coupler component which is laid out in the "flip configuration" upon the C-ROSA PIC substrate. The MMI coupler "flip configuration" enables the interconnection of the MMI coupler output access waveguides to the PDs with non-intersecting integrated optical waveguides and without the intervention of any additional coupler elements. The integrated optical waveguides that connect the MMI coupler OH to the PDs can be flexibly laid out upon the waveguide routing area in a way to accommodate equal path lengths. In this case the optical and electrical paths are de-correlated and any additional design effort aiming to equalize optical path imbalances in the electrical domain is avoided. As such the electrical lines that connect the PDs to the C-ROSA PIC outputs are uniform. The embodiment described below enables 75% coupler component reduction compared to the conventional C-ROSA PIC of FIG. 4. It also enables 50% coupler component reduction compared to the known C-ROSA PIC of FIG. 6 avoiding the need for co-design of various interconnected coupler elements. In addition, the C-ROSA of the present disclosure minimizes design and fabrication complexity compared to the C-ROSA of FIG. 7 since it does not require co-design and painstaking optimization of optical and electrical paths. As such it can be resilient against phase errors and power imbalance and at the same time guarantee uniform RF performance.

FIG. 8 shows a C-ROSA PIC 120 comprising a substrate upon which the C-ROSA input/output ports and photonic components described below are disposed. The term "substrate" according to the present disclosure should be interpreted as material that is suitable for the photonic components to be fabricated thereon. C-ROSA PIC 120 comprises two optical input ports 121-A and 121-B and four electrical output ports 122-A through 122D—the position of the optical and electrical ports shown in FIG. 7 is exemplary and different locations maybe contemplated without deviating from the scope of the present invention. The input ports receive the S and LO optical signals whereas the output ports deliver electrical signals corresponding to the quadrature components of the demodulated input.

The PIC further includes four PDs 126-A through 126-D forming two pairs of balanced PDs disposed upon the substrate in proximity to the C-ROSA electrical outputs 122-A through 122-D, with all PDs arranged across a horizontal or vertical axis and each PD connected to an electrical output via a conducting lead. The OH functionality is delivered by a single 4×4 MMI coupler having a main body 123, four attached input access waveguides 124-A through 124-D and four attached output access waveguides 125-A through 125-D. C-ROSA 120 uses the 4×4 MMI coupler with a layout suitable to avoid the requirement for a waveguide crossing. In detail, within C-ROSA 120, the single 4×4 MMI coupler is arranged with its optical axis perpendicular to the arrangement axis of the PDs and with the plurality of its input access waveguides 125-A through 125-D facing the plurality of PDs 126-A through 126-D. Such configuration which is referred to as "flip configuration", and with reference to the C-ROSA 60 described previously, may be realised by flipping the MMI coupler about a vertical axis.

Two of the MMI coupler input access waveguides-in Fig. 8, 124-A and 124-C- are configured to receive the S and LO signals from inputs 121-A and 121-B. The input access waveguides that receive S and LO signals are configured to launch light to the main body of the MMI coupler 123 and the plurality of output access waveguides 125A-D are configured to collect the multi-mode interference signal products from the MMI coupler main body 123. By adjusting the geometrical characteristics of 123, 124-A through 124-D and 125-A through 125-D, the OH functionality can be obtained and the required 90-degree phase shifts are provided at the MMI coupler output access waveguides 125-A through 125-D. In such configuration and in accordance with the principles of self-imaging properties of N×N MMI couplers, the S and LO mixing products are delivered at the MMI coupler output access waveguides as shown in FIG. 8.

In other examples, the spacing between a pair of input access waveguides of the plurality of input access waveguides 124-A through 124-D and the spacing between a pair of output access waveguides of the plurality of output access waveguides 125-A through 125-D is uniform. In that way, effective operation with optimized coupling efficiency of the MMI coupler is ensured.

Additionally, each one of the plurality of the output access waveguides of the MMI coupler is connected to the plurality of PDs via integrated optical waveguides 127-A through 125-D. To avoid waveguide intersections, the integrated optical waveguide 127-A. interconnecting output access waveguide 125-A to PD 126-A, is routed in the area in front of the MMI coupler output access waveguides and through the area along the north side of the MMI coupler main body. Additionally, the integrated optical waveguides 127-B through 127-D, interconnecting the output access waveguides 125-B through 125-D to PDs 126-B through 126-D, are routed in the area in front of the MMI coupler output access waveguides and through the area along the south side of the MMI coupler main body. In this configuration, the intersection of the integrated optical waveguides 127-A through 127-D that connect the MMI coupler output access waveguides 125-A through 125-D to the PDs 126-A through 126-D is avoided.

In other examples, the optical waveguides interconnecting the MMI coupler output access waveguides 125-A through 125-D to PDs 126-A through 126-D are routed upon the waveguide routing area in a way that they exhibit equal lengths. This can be achieved by forming each one of the four optical paths with bent waveguide portions, straight waveguide portions or combination of both. The equal length of the waveguides is important in order to achieve phase matching of the signals arriving at the PDs. Due to the equal optical path lengths the electrical lines interconnecting PDs 126-A through 126-D to the electrical outputs 122-A through 122-D are routed upon or through the substrate in a uniform manner. Uniform electrical lines are important in order to minimize design complexity and obtain uniform RF performance of the output electrical signals.

FIG. 9 that shows another embodiment, relates to a coherent receiver that uses two C-ROSA PIC devices of the same form and function as the embodiment of FIG. 8 with the aim to perform dual-polarization coherent detection.

In detail, C-ROSA PIC 140 comprises C-ROSA PIC 140-A and 140-B sharing the same substrate as well as input ports 141-A and 141-B, with each C-ROSA PIC having a separate set of electrical output ports 142-A through 142-D, which form the eight electrical outputs of C-ROSA PIC 140. Input port 141-A receives the S optical signal which comprises two orthogonal polarization components, whereas input port 141-B receives the LO optical signal.

The PIC further includes PS 148 disposed upon the substrate within the front-end of 140 which receives S from input port 141-A and provides the two polarization components S-x and S-y at its output ports. Integrated optical waveguides 148-A and 148-B are disposed upon the waveguide routing area 150 interconnecting PS 148 output ports to the MMI coupler 143 input access waveguides 144-A of C-ROSA PIC 140-A and 140-B.

The PIC further includes OS 149 disposed upon the substrate in the back-end of 140 and between C-ROSA PIC 140-A and 140-B, receiving LO optical signal from input port 141-B and providing two portions LO-1 and LO-2 at its output ports. Integrated optical waveguides 149-A and 149-B are disposed upon the waveguide routing area 150 interconnecting OS 149 output ports to the MMI coupler 143 input access waveguides 144-C of C-ROSA PIC 140-A and 140-B.

In this configuration, and following the function of the C-ROSA PIC of FIG. 8 for each C-ROSA PIC of FIG. 9, C-ROSA PIC 140 performs dual polarization coherent reception inheriting the advantages of C-ROSA PIC of FIG. 8 related to using a single MMI coupler OH for each polarization, non-intersecting, equalized optical waveguides and uniform electrical lines.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure. For example the position of the C-ROSA PIC input and output ports shown in FIGS. 8 and 9 is exemplary and can be moved to any of the C-ROSA PIC sides by proper routing of the optical waveguides connecting the C-ROSA PIC input ports to the MMI coupler input access waveguides as well as the moving the PD location to any allowable location within the C-ROSA substrate.

The invention claimed is:

1. A coherent receiver optical sub-assembly photonic integrated circuit (PIC) comprising:

a substrate for photonic integration upon which the following elements are disposed:

two input ports for respectively delivering a phase modulated optical signal(S) and a continuous wave local oscillator (LO) optical signal, the S and LO optical signals providing mixing products;

four electrical output ports for delivering electrical signals corresponding to the mixing products of S and LO optical signals;

four photodetectors forming two pairs of balanced photodetectors arranged in the vicinity of the electrical output ports, the four photodetectors being arranged along an arrangement axis on the substrate parallel to an output facet of the PIC and connected to the electrical output ports via uniform electrical lines;

a single multi-mode interference (MMI) coupler configured to operate as a 90-degree optical hybrid, the MMI couple having a main body, a plurality of input access waveguides facing the photodetectors, a plurality of output access waveguides, and an optical axis perpendicular to the arrangement axis of the photodetectors, two of the plurality of input access waveguides being configured to respectively receive the S and LO optical signals from the two input ports and guide light to the main body of the MMI coupler main body, and the plurality of output access waveguides being configured to collect multi-mode interference signal products from the main body of the MMI coupler and deliver the mixing products of the S and LO optical signals; and four integrated optical waveguides respectively interconnecting four of the plurality of output access waveguides to four of the plurality of photodetectors in a non-intersecting manner to provide four optical paths between the corresponding output access waveguides and photodetectors, wherein:

a first one of the four integrated optical waveguides interconnecting a first one of the four output access waveguides to a first one of the four photodetectors is routed in an area in front of the plurality of output access waveguides and through an area along an upper portion of the PIC and above the MMI coupler main body; and second, third and fourth ones of the four integrated optical waveguides interconnecting respective second, third and fourth ones of the ones of the output access waveguides to respective second, third and fourth ones of the four photodetectors are routed in an area in front of the plurality of output access waveguides and through the area along an lower portion of the PIC and below the MMI coupler main body.

2. The coherent receiver optical sub-assembly photonic integrated circuit according to claim 1, wherein a spacing between a pair of input access waveguides of the plurality of attached input access waveguides and a spacing between a pair of output access waveguides of the plurality of attached output access waveguides is uniform.

3. The coherent receiver optical sub-assembly photonic integrated circuit according to claim 1, wherein at least one of the four integrated optical waveguides comprises either bent waveguide portions or straight waveguide portions or combination of both bent and straight waveguide portions.

4. The coherent receiver optical sub-assembly photonic integrated circuit according to claim 1, wherein the four integrated optical waveguides comprise waveguide portions disposed on the substrate and selected so that the four optical paths are of equal length.

5. The coherent receiver optical sub-assembly photonic integrated circuit according to claim 1, wherein at least one of the four optical paths includes phase shifting elements.

6. The coherent receiver optical sub-assembly photonic integrated circuit according to claim 1, wherein the S and LO optical signals contain either a transverse electric or a transverse magnetic polarization state.

7. A dual-polarization coherent receiver system comprising:

two coherent receiver optical sub-assembly photonic integrated circuits according to claim 1, the substrate of each coherent receiver optical sub-assembly photonic integrated circuit forming a common substrate shared by the two coherent receiver optical sub-assembly photonic integrated circuits;

a polarization splitter disposed upon the common substrate within a front-end of the system, the polarization splitter having one input port and two output ports and being configured to receive an optical signal S having two orthogonal polarization components (S-x, S-y) and to split the two orthogonal polarization components on the two output ports;

a first pair of integrated optical waveguides interconnecting the output ports of the polarization splitter to a first pair of the input access waveguides of the two MMI couplers of the two coherent receiver optical sub-assembly photonic integrated circuits;

an optical splitter disposed on the common substrate within a back-end of the system and between the two coherent receiver optical sub-assembly photonic integrated circuits, the optical splitter having one input port and two output ports and being configured to receive a LO optical signal and to split the LO optical signal into two portions on the two output ports of the optical splitter; and a second pair of integrated optical waveguides interconnecting the output ports of the optical splitter to a second pair of the input access waveguides of the two MMI couplers of the two coherent receiver optical sub-assembly photonic integrated circuits.

* * * * *